(No Model.)
E. J. ROCHE.
MEANS FOR CONTROLLING OPERATIVE CONNECTION BETWEEN FEED SCREWS AND FOLLOWERS.
No. 531,427. Patented Dec. 25, 1894.
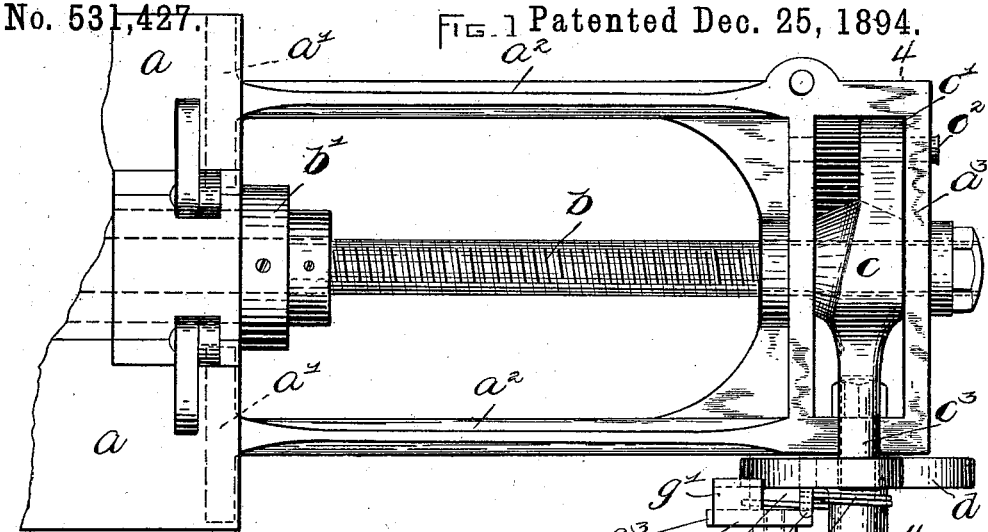
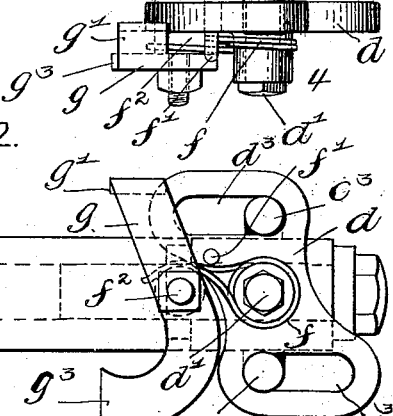
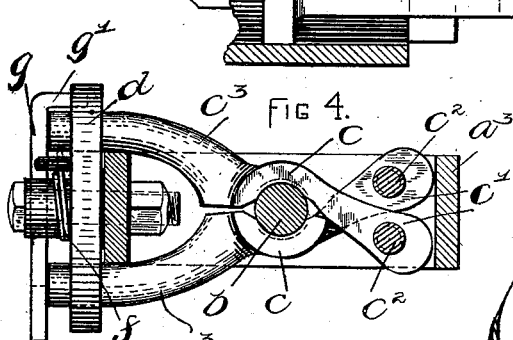
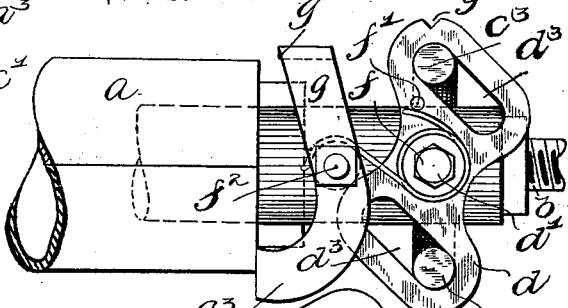
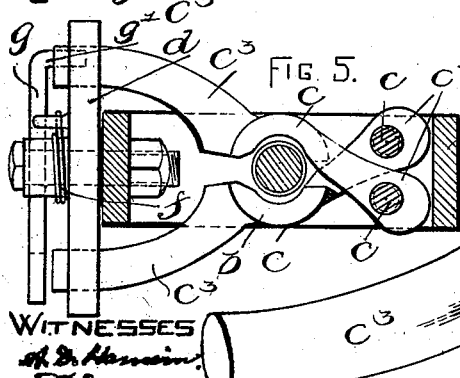
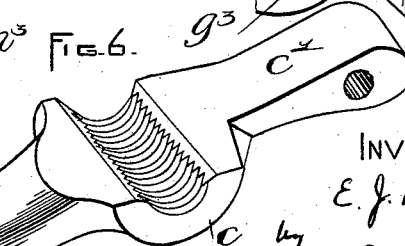
INVENTOR.
E. J. Roche
WITNESSES
THE NORRIS PETERS CO., PHOTO-LITHO., WASHINGTON, D. C.

United States Patent Office.

EDWARD J. ROCHE, OF MILFORD, MASSACHUSETTS.

MEANS FOR CONTROLLING OPERATIVE CONNECTION BETWEEN FEED-SCREWS AND FOLLOWERS.

SPECIFICATION forming part of Letters Patent No. 531,427, dated December 25, 1894.

Application filed March 12, 1894. Serial No. 503,306. (No model.)

*To all whom it may concern:*

Be it known that I, EDWARD J. ROCHE, of Milford, in the county of Worcester and State of Massachusetts, have invented certain new and useful Improvements in Means for Controlling Operative Connection between Feed-Screws and Followers, of which the following is a specification.

This invention relates to an improvement in means for controlling operative connection between a feed-screw and the follower, in machines such as vegetable cutters or the like, in which it is desired to automatically stop the feed at a predetermined period of the machine's operation.

The apparatus here shown is designed for application to the bone-cutting machine illustrated in an application for patent filed by me February 8, 1894, Serial No. 499,497.

The object of the invention is to provide for automatically and instantly throwing open a separable nut which engages the feed screw, so as to prevent stripping the thread of the screw which is likely to occur when the nut opens gradually.

To this end the invention consists in certain novel features of construction and combinations of parts recited in the appended claims.

The accompanying drawings illustrate an embodiment of the invention, and form part of the specification.

Of said drawings—Figure 1 shows a plan view of a portion of a machine to which my invention is applied. Fig. 2 shows a part side elevation and part sectional view. Fig. 3 shows a similar view, with the parts in a different adjustment. Fig. 4 shows a cross-section on the line 4—4 of Fig. 1. Fig. 5 shows a similar cross-section showing the separable nut open. Fig. 6 shows a perspective detail of one of the members of the separable nut.

In the drawings—the letter $a$ designates cylinders for holding the material under treatment, such as the cylinders shown in my application above referred to. The followers $a'$ engage the bores of these cylinders, and are formed on the ends of bars $a^2$, which are connected by a cross-head or frame $a^3$.

The letter $b$ designates a feed-screw, which is arranged to turn loose in a bearing $b'$ on the frame of the machine and extends loosely through the side-bars of the cross-head or frame $a^3$.

The separable nut is supported in the frame $a^3$, and is composed of two pivotal members, each of which comprises a substantially semi-circular internally-threaded portion $c$, an arm $c'$ embracing a pivot pin $c^2$ supported in the frame $a^3$, and a rounded arm $c^3$ extending past the front end of the frame $a^3$ and engaged by the controlling device hereinafter described. The said pivotal nut-members are adapted to be moved toward and from each other to engage with and disengage from the feed-screw $b$; and in order to insure the complete disengagement of the nut-members from the screw by a comparatively slight outward movement, the arms $c'$ of the said members are crossed, as clearly shown in Figs. 4 and 5.

The nut-controlling device comprises a plate $d$ centrally pivoted on the stud $d'$, which is fastened in one end of the frame $a^3$, and the said plate is formed on opposite sides of the pivot with parallel slots $d^3$ which receive the rounded arms $c^3$ of the pivotal nut-members. By turning the said plate $d$ in one direction, the engagement of the sides of said slots with the rounded arms $c^3$ moves said arms away from each other and opens the nut; whereas movement of the plate in the opposite direction closes the nut.

A spiral spring $f$ is mounted on the hub or boss of the plate $d$, and bears at one end against a pin $f'$ fastened in the plate, and at the opposite end against the stud $f^2$ fastened to one of the bars $a^2$. Said spring tends to throw the plate $d$ in a direction to open the nut. The detent, in the form of a bar $g$ is pivoted on the stud $f^2$, and is formed with a shoulder $g'$ at the upper end, adapted to engage the shoulder $g^2$ on the plate $d$; and when thus engaged with the said plate, this detent holds it in position closing the nut, and restrains the spring $f$. The bar $g$ is formed with a lateral arm $g^3$ at its lower end, which is designed to abut a fixed part of the machine, as for example the end of one of the cylinders $a$. This takes place when the limit of the feed has been reached. By the abutment of the arm $g^3$ against a cylinder $a$, the shoulder $g'$ of the detent is moved clear of the shoulder $g^2$, and the spring $f$ immediately throws the nut open, disengaging it completely from the feed-screw.

When the followers are drawn back to their initial position, the cam-plate $d$ may be turned by hand to close the nut on the screw and the detent moved into engagement with said cam-plate.

It will be seen that the arrangement described will prevent stripping the thread of the feed-screw.

It is evident the invention is not restricted to the construction shown, but may be embodied in other forms.

Having thus described my invention, what I claim as new, and desire to secure by Letters Patent, is—

1. The combination of a feed-screw, a follower to be actuated thereby, a separable nut carried by the follower and adapted to engage the feed-screw, a pivotal cam interlocked with the nut and adapted to open and close the same by movement on its pivot, a spring impelling said cam in a direction to close the nut, and a detent for engaging the cam to restrain the spring, substantially as described.

2. The combination of a feed-screw, a follower to be actuated thereby, a separable nut carried by the follower and adapted to engage the feed-screw, said nut being composed of two pivotal members, a pivotal cam-plate slotted for engagement of the said nut-members, a spring actuating said cam-plate in a direction to close the nut, and a detent arranged for engagement with the cam-plate so as to restrain the said spring, and adapted to be tripped by encountering an abutment.

3. The combination of a feed-screw, a follower to be actuated thereby, a separable nut carried by the follower and adapted to engage the feed-screw, said nut being composed of two crossed pivotal members, a spring-actuated controlling device for opening and closing the nut, and a detent for restraining the spring and adapted to be tripped by encountering an abutment.

4. The combination of a fixed cylinder, a feed-screw, a follower to be actuated by the feed-screw, a separable nut carried by the follower and composed of two pivotal members, a pivotal cam-plate slotted for engagement of said nut-members and adapted to open and close the nut, a spring actuating said cam-plate in a direction to open the nut, and a pivotal detent arranged for engagement with the cam-plate to restrain the spring and adapted to abut the cylinder and be tripped thereby.

In testimony whereof I have signed my name to this specification, in the presence of two subscribing witnesses, this 3d day of March, A. D. 1894.

EDWARD J. ROCHE.

Witnesses:
A. D. HARRISON,
F. P. DAVIS.